United States Patent
Jiang

(10) Patent No.: US 11,399,348 B2
(45) Date of Patent: Jul. 26, 2022

(54) POWER HEADROOM REPORT TRANSMISSION METHOD AND APPARATUS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 176 days.

(21) Appl. No.: 16/759,773

(22) PCT Filed: Nov. 3, 2017

(86) PCT No.: PCT/CN2017/109291
§ 371 (c)(1),
(2) Date: Apr. 28, 2020

(87) PCT Pub. No.: WO2019/084909
PCT Pub. Date: May 9, 2019

(65) Prior Publication Data
US 2021/0185622 A1   Jun. 17, 2021

(51) Int. Cl.
*H04W 52/36*     (2009.01)
*H04L 25/02*     (2006.01)
*H04L 5/00*      (2006.01)

(52) U.S. Cl.
CPC ......... *H04W 52/365* (2013.01); *H04L 5/0048* (2013.01); *H04L 25/0226* (2013.01)

(58) Field of Classification Search
None
See application file for complete search history.

(56) References Cited

U.S. PATENT DOCUMENTS 9,295,077 B2      3/2016   Guo
2011/0250918 A1*  10/2011  Jen ................. H04W 52/365
                                                       455/517
(Continued)

FOREIGN PATENT DOCUMENTS

CA    2 945 173 A1    11/2015
CN    101702965 A      5/2010
(Continued)

OTHER PUBLICATIONS

Combined Chinese Office Action and Search Report dated Jun. 24, 2020 in corresponding Chinese Patent Application No. 201780001828.0 (with English Translation of Category of Cited Documents), 7 pages.

(Continued)

*Primary Examiner* — Steve R Young
(74) *Attorney, Agent, or Firm* — Oblon, McClelland, Maier & Neustadt, L.L.P.

(57) ABSTRACT

The disclosure relates to a power headroom report transmission method which can include determining whether there is a trigger event of a power headroom report, and in a case that there is the trigger event of a power headroom report, determining a way for calculating the power headroom of a supplementary uplink carrier and/or other carrier according to the situation that a physical uplink control channel, a physical uplink shared channel and/or a channel sounding reference signal configured for a supplementary uplink carrier and other carriers of a first cell in which a supplementary uplink carrier is configured in service cells of user device, and calculating the power headroom of the supplementary uplink carrier and/or other carrier according to the way. The method can further include transmitting the power headroom report corresponding to the power headroom to the base station.

16 Claims, 9 Drawing Sheets

(56) References Cited

U.S. PATENT DOCUMENTS

| | | | | |
|---|---|---|---|---|
| 2012/0093020 | A1* | 4/2012 | Iwai | H04L 5/0053 |
| | | | | 370/252 |
| 2012/0281633 | A1* | 11/2012 | Kim | H04W 52/365 |
| | | | | 370/328 |
| 2012/0314603 | A1* | 12/2012 | Wen | H04W 52/365 |
| | | | | 370/252 |
| 2013/0176953 | A1* | 7/2013 | Stern-Berkowitz | |
| | | | | H04W 52/365 |
| | | | | 370/329 |
| 2014/0177602 | A1 | 6/2014 | Chen et al. | |
| 2015/0173031 | A1* | 6/2015 | Kim | H04W 52/545 |
| | | | | 455/522 |
| 2017/0094675 | A1 | 3/2017 | Salem et al. | |
| 2017/0188314 | A1 | 6/2017 | Mueck et al. | |
| 2019/0045459 | A1* | 2/2019 | Niu | H04W 52/146 |
| 2019/0174432 | A1* | 6/2019 | Wang | H04W 52/365 |

FOREIGN PATENT DOCUMENTS

| | | | |
|---|---|---|---|
| CN | 102158942 | A | 8/2011 |
| CN | 102752838 | A | 10/2012 |
| CN | 103906081 | A | 7/2014 |
| CN | 106851809 | A | 6/2017 |
| CN | 106912097 | A | 6/2017 |
| WO | WO 2013/135195 | A1 | 9/2013 |

OTHER PUBLICATIONS

ZTE, "Offline summary for AI 7.6 NR UL power control", 3GPP TSG RAN WG1 Meeting #90bis R1-1718883, Oct. 9-13, 2017, 21 page.

Nokia, "Discussion on NR power control framework", 3GPP TSG RAN WG1 Meeting 90bis R1-1718692, Oct. 9-13, 2017, 4 pages.

LG Electronics, "Discussion on UL power control for NR", 3GPP TSG RAN WG1 Meeting 90bis R1-1717983, Oct. 9-13, 2017, 6 pages.

InterDigital Inc., "Power Headroom Reporting for NR", 3GPP TSG-RAN WG2 Meeting #99bis R2-1710664, (Revision of R2-1708733), Oct. 9-17, 2017, 4 pages.

Samsung "Connected mode aspects of supplementary uplink frequency", 3GPP TSG-RAN WG2 #99bis R2-1711808, Oct. 9-13, 2017, 4 pages.

Huawei et al., "UL power control for SUL and LTE-NR uplink coexistence with UL sharing," 3GPP TSG WG1 Meeting #90 R1-1712164, Aug. 21-25, 2017, 5 pages total.

Qualcomm Incorporated., "Power control and PHR for NR," 3GPP TSG RAN WG1 Meeting #90 R1-1713479, Aug. 21-25, 2017, 6 pages total.

International Search Report dated May 22, 2018 in PCT/CN2017/109291 filed on Nov. 3, 2017 citing documents AA, AO-AP and AW-AX therein, 2 pages.

* cited by examiner

Determining whether a carrier on which a channel sounding reference signal is located is different from a carrier on which a link control channel and/or a physical uplink shared channel is located after the carriers on which a physical uplink control channel, a physical uplink shared channel, and/or a channel sounding reference signal are located of the first cell is changed, and in a case that they are different, determining that there is a trigger event — S13

Fig.4

Determining a first carrier configured with a physical uplink control channel or a physical uplink shared channel among the supplementary uplink carrier and other carriers, and then determining a way for calculating power headroom of the first carrier is a first power headroom calculating way — S21

Fig.5

Determining a second carrier configured with a physical uplink control channel and a physical uplink shared channel in the first carrier, and determining a way for calculating power headroom of the second carrier is the first power headroom calculating way and a second power headroom calculating way — S211

Fig.6

Determining a third carrier which is not configured with a physical uplink control channel and a physical uplink shared channel, and is configured with a channel sounding reference signal in the supplementary uplink carrier and other carriers, and determining that a way for calculating power headroom of the third carrier is a third power headroom calculating way — S22

Fig.7

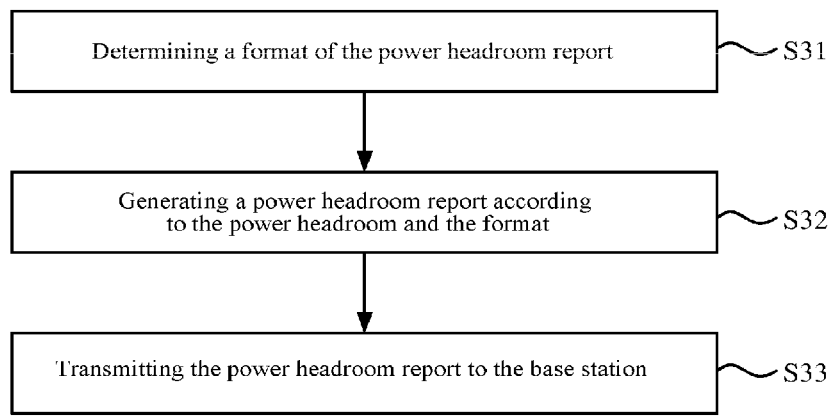
Fig.8
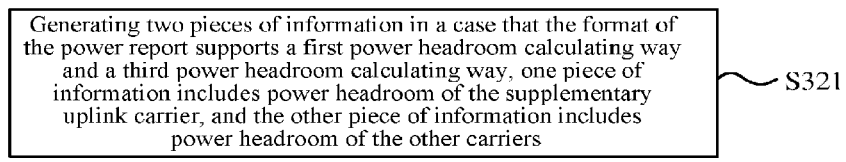
Fig.9
| R | R |   | PH |
|---|---|---|----|
| R | R | R | PH |
Fig.10

Generating 2m pieces of information in a case that the format of the power report supports a first power headroom calculating way, a second power headroom calculating way, a third power headroom calculating way and each of the serving cells, a first pair of information of the 2m pieces of information includes power headroom calculated according to the second power headroom calculating way of the supplementary uplink carrier or other carriers of the primary cell of the user equipment, a second pair of information includes power headroom of the supplementary uplink carrier of the primary cell, and a third pair of information includes power headroom of other carriers of the primary cell; where in a case that the format of the power headroom report also supports a non-special cell configured with a physical uplink control channel and a physical uplink shared channel, m is an integer greater than 4, otherwise, m is an integer greater than 3 — S322

Fig.11

| $c_7$ | $c_6$ | $c_5$ | $c_4$ | $c_3$ | $c_2$ | $c_1$ | R |
|---|---|---|---|---|---|---|---|
| P | V | \multicolumn{6}{c}{PH (Type2, PCell)} |
| R | R | \multicolumn{6}{c}{Pcmax, c1} |
| P | V | \multicolumn{6}{c}{PH (Type1/3, PCell)} |
| R | R | \multicolumn{6}{c}{Pcmax, c2} |
| P | V | \multicolumn{6}{c}{PH (Type1/3, PCell)} |
| R | R | \multicolumn{6}{c}{Pcmax, c3} |
| P | V | \multicolumn{6}{c}{PH (TypeX, SCell1)} |
| R | R | \multicolumn{6}{c}{Pcmax, c4} |

......

| P | V | PH (TypeX, SCelln) |
|---|---|---|
| R | R | Pcmax, c(n+3) |

Fig.12

| c7 | c6 | c5 | c4 | c3 | c2 | c1 | R |
|----|----|----|----|----|----|----|----|
| P | V | \multicolumn{6}{c} PH (Type2, PCell) |
| R | R | Pcmax, c1 |||||||
| P | V | PH(Type2, PUCCH SCell) |||||||
| R | R | Pcmax, c2 |||||||
| P | V | PH (Type1/3, PCell) |||||||
| R | R | Pcmax, c3 |||||||
| P | V | PH (Type1/3, PCell) |||||||
| R | R | Pcmax, c4 |||||||
| P | V | PH (TypeX, SCell1) |||||||
| R | R | Pcmax, c5 |||||||

... ...

| P | V | PH (TypeX, SCelln) |
|---|---|---|
| R | R | Pcmax, c(n+4) |

Fig.13

Generating 2n pieces of information in a case that the format of the power report supports dual connectivity, a first pair of information of the 2n pieces of information includes power headroom calculated according to a second power headroom calculating way of a supplementary uplink carrier or other carriers of a primary cell of the user equipment, a second pair of information includes power headroom calculated according to a second power headroom calculating way of the supplementary uplink carrier or other carriers of a primary and secondary cell of the user equipment, a third pair of information includes power headroom of the supplementary uplink carrier of the primary cell, and a fourth pair of information includes the power headroom of other carriers of the primary cell; where in a case that the primary and secondary cells are not configured with supplementary uplink carrier, n is an integer greater than 5, otherwise, n is an integer greater than 7, and a fifth pair of information of the n pieces of information includes power headroom of the supplementary uplink carrier of the primary and secondary cells, and a sixth pair of information includes power headroom of other carriers of the primary and secondary cells — S323

Fig.14

| c6 | c5 | c4 | c3 | c2 | c1 | R | R |
|----|----|----|----|----|----|---|---|
| P | V | \multicolumn{6}{c}{PH (Type2, PCell)} |
| R | R | \multicolumn{6}{c}{Pcmax, c1} |
| P | V | \multicolumn{6}{c}{PH (Type2, Pscell)} |
| R | R | \multicolumn{6}{c}{Pcmax, c2} |
| P | V | \multicolumn{6}{c}{PH (Type1/3, PCell)} |
| R | R | \multicolumn{6}{c}{Pcmax, c3} |
| P | V | \multicolumn{6}{c}{PH (Type1/3, PCell)} |
| R | R | \multicolumn{6}{c}{Pcmax, c4} |
| P | V | \multicolumn{6}{c}{PH (TypeX, SCell1)} |
| R | R | \multicolumn{6}{c}{Pcmax, c5} |

......

| P | V | PH (TypeX, SCelln) |
|---|---|---|
| R | R | Pcmax, c(n+4) |

Fig.15

| c6 | c5 | c4 | c3 | c2 | c1 | R | R |
|---|---|---|---|---|---|---|---|
| P | V | \multicolumn{6}{c}{PH (Type2, PCell)} |
| R | R | \multicolumn{6}{c}{Pcmax, c1} |
| P | V | \multicolumn{6}{c}{PH (Type2, Pscell)} |
| R | R | \multicolumn{6}{c}{Pcmax, c2} |
| P | V | \multicolumn{6}{c}{PH (Type1/3, PCell)} |
| R | R | \multicolumn{6}{c}{Pcmax, c3} |
| P | V | \multicolumn{6}{c}{PH (Type1/3, PCell)} |
| R | R | \multicolumn{6}{c}{Pcmax, c4} |
| P | V | \multicolumn{6}{c}{PH (Type1/3, PsCell)} |
| R | R | \multicolumn{6}{c}{Pcmax, c5} |
| P | V | \multicolumn{6}{c}{PH (Type1/3, PsCell)} |
| R | R | \multicolumn{6}{c}{Pcmax, c6} |
| P | V | \multicolumn{6}{c}{PH (TypeX, SCell1)} |
| R | R | \multicolumn{6}{c}{Pcmax, c7} |

... ...

| P | V | PH (TypeX, SCelln) |
|---|---|---|
| R | R | Pcmax, c(n+6) |

Fig.16

POWER HEADROOM REPORT TRANSMISSION METHOD AND APPARATUS

CROSS REFERENCE

This application is the 371 application of PCT Application No. PCT/CN2017/109291, filed on Nov. 3, 2017, the entire content of which is incorporated herein by reference.

TECHNICAL FIELD

The present disclosure relates to the technical field of terminals, and in particular, to a power headroom report transmission method, power headroom report transmission apparatus, an electronic device and a computer readable storage medium.

BACKGROUND

In Long Term Evolution (LTE), the user device (user equipment) may send a power headroom report (PHR) to the base station, so that the base station adjusts the power of the user device according to the PHR.

A supplement Uplink (SUL) is introduced in New Radio (NR) to enhance uplink coverage. In a case that a cell is configured with SUL, the cell will correspond to two uplink carriers, one SUL carrier and one non-SUL carrier.

However, the current scheme for the user device to report the PHR to the base station in LTE is not applicable to the case where two uplink carriers are configured, so the PHR cannot be sent to the base station well for the cell configured with the SUL carrier.

SUMMARY

A first aspect of the present disclosure provides a power headroom report transmission method that can be applied to a user device. The method can include determining whether there is a trigger event of a power headroom report and determining a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first cell configured with the supplementary uplink carrier in a serving cell of the user device, and calculating the power headroom of the supplementary uplink carrier and/or other carriers according to the way in a case that there is the trigger event. The method can further include transmitting a power headroom report corresponding to the power headroom to a base station.

The determining whether there is a cell configured with the supplementary uplink carrier in the serving cell, and in a case that there is the cell, determining that there is a trigger event.

Alternatively, the determining whether there is a trigger event for a power headroom report can further include determining whether carriers on which a physical uplink control channel, a physical uplink shared channel, and/or a channel sounding reference signal are located of the first cell occur change, and in a case that the change occurs, determining that there is a trigger event.

In an embodiment, the determining whether there is a trigger event for a power headroom report can include determining whether a carrier on which a channel sounding reference signal is located is different from a carrier on which a link control channel (physical uplink control channel) and/or a physical uplink shared channel is located after the carriers on which a physical uplink control channel, a physical uplink shared channel, and/or a channel sounding reference signal are located of the first cell is changed, and in a case that they are different, determining that there is a trigger event.

Alternatively, the determining a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device can include determining a first carrier configured with a physical uplink control channel or a physical uplink shared channel among the supplementary uplink carrier and other carriers, and then determining a way for calculating power headroom of the first carrier is a first power headroom calculating way.

Also, the determining a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device further can include determining a second carrier configured with a physical uplink control channel and a physical uplink shared channel in the first carrier, and determining a way for calculating power headroom of the second carrier is the first power headroom calculating way and a second power headroom calculating way.

Further, the determining a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device can include determining a third carrier which is not configured with a physical uplink control channel and a physical uplink shared channel, and is configured with a channel sounding reference signal in the supplementary uplink carrier and other carriers, and determining that a way for calculating power headroom of the third carrier is a third power headroom calculating way.

Alternatively, the transmitting a power headroom report corresponding to the power headroom to a base station includes determining a format of the power headroom report and generating a power headroom report according to the power headroom and the format. The method can further include transmitting the power headroom report to the base station.

Additionally, the generating a power headroom report according to the power headroom and the format can include generating two pieces of information in a case that the format of the power report (power headroom report) supports a first power headroom calculating way and a third power headroom calculating way, one piece of information includes power headroom of the supplementary uplink carrier, and the other piece of information includes power headroom of the other carriers.

Generating a power headroom report according to the power headroom and the format can further include generating 2m pieces of information in a case that the format of the power report supports a first power headroom calculating way, a second power headroom calculating way, a third power headroom calculating way and each of the serving cells, a first pair of information of the 2m pieces of information includes power headroom calculated according to the second power headroom calculating way for the supplementary uplink carrier or other carriers of the primary cell of the user device, a second pair of information includes power headroom of the supplementary uplink carrier of the primary cell, and a third pair of information includes power headroom of other carriers of the primary cell. In a case that the format of the power headroom report also supports a non-special cell configured with a physical uplink control channel and a physical uplink shared channel, m is an integer greater than 4, otherwise, m is an integer greater than 3.

Alternatively, the generating a power headroom report according to the power headroom and the format can include generating 2n pieces of information in a case that the format of the power report supports dual connectivity, a first pair of information of the 2n pieces of information includes power headroom calculated according to a second power headroom calculating way for a supplementary uplink carrier or other carriers of a primary cell of the user device, a second pair of information includes power headroom calculated according to a second power headroom calculating way for the supplementary uplink carrier or other carriers of a primary and secondary cells of the user device, a third pair of information includes power headroom of the supplementary uplink carrier of the primary cell, and a fourth pair of information includes the power headroom of other carriers of the primary cell. In a case that the primary and secondary cells are not configured with supplementary uplink carrier, n is an integer greater than 5. Otherwise, a is an integer greater than 7, and a fifth pair of information of the 2n pieces of information includes power headroom of the supplementary uplink carrier of the primary and secondary cells, and a sixth pair of information includes power headroom of other carriers of the primary and secondary cells.

A second aspect of the present disclosure provides a power headroom report transmission apparatus that can be applied to a user device. The apparatus can include a trigger determining module that is configured to determine whether there is a trigger event of a power headroom report, and a way determining module that is configured to determine a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device in a case that there is the trigger event. The apparatus can further include a calculating module that is configured to calculate the power headroom of the supplementary uplink carrier and/or other carriers according to the way, and a transmitting module that is configured to transmit a power headroom report corresponding to the power headroom to a base station.

Alternatively, the trigger determining module can include a configuration determining sub-module that is configured to determine whether there is a cell configured with the supplementary uplink carrier in the serving cell, and in a case that there is the cell, determine that there is a trigger event.

Additionally, the trigger determining module can include a change determining sub-module that is configured to determine whether carriers on which a physical uplink control channel, a physical uplink shared channel, and/or a channel sounding reference signal are located of the first cell occur change, and in a case that the change occurs, determine that there is a trigger event.

Alternatively, the determine whether there is a trigger event of a power headroom report can include a same determining sub-module that is configured to determine whether a carrier on which a channel sounding reference signal is located is different from a carrier on which a link control channel and/or a physical uplink shared channel is located after the carriers on which a physical uplink control channel, a physical uplink shared channel, and/or a channel sounding reference signal are located of the first cell are changed, and in a case that they are different, determine that there is a trigger event.

The way determining module is configured to determine a first carrier configured with a physical uplink control channel or a physical uplink shared channel among the supplementary uplink carrier and other carriers, and then determine a way for calculating power headroom of the first carrier is a first power headroom calculating way.

Alternatively, the way determining module is configured to determine a second carrier configured with a physical uplink control channel and a physical uplink shared channel in the first carrier, and determine a way for calculating power headroom of the second carrier is the first power headroom calculating way and a second power headroom calculating way.

Further, the way determining module is configured to determine a third carrier which is not configured with a physical uplink control channel and a physical uplink shared channel, and is configured with a channel sounding reference signal in the supplementary uplink carrier and other carriers, and determine that a way for calculating power headroom of the third carrier is a third power headroom calculating way.

The transmitting module can include a format determining sub-module that is configured to determine a format of the power headroom report, can include a report generating sub-module that is configured to generate a power headroom report according to the power headroom and the format, and transmitting sub-module that is configured to transmit the power headroom report to the base station.

Alternatively, the report generating sub-module is configured to generate two pieces of information in a case that the format of the power report supports a first power headroom calculating way and a third power headroom calculating way, one piece of information includes power headroom of the supplementary uplink carrier, and the other piece of information includes power headroom of the other carriers.

Further, the report generating sub-module is configured to generate 2m pieces of information in a case that the format of the power report supports a first power headroom calculating way, a second power headroom calculating way, a third power headroom calculating way and each of the serving cells, a first pair of information of the 2m pieces of information includes power headroom calculated according to the second power headroom calculating way for the supplementary uplink carrier or other carriers of the primary cell of the user device, a second pair of information includes power headroom of the supplementary uplink carrier of the primary cell, and a third pair of information includes power headroom of other carriers of the primary cell. In a case that the format of the power headroom report also supports a non-special cell configured with a physical uplink control channel and a physical uplink shared channel, m is an integer greater than 4, otherwise, m is an integer greater than 3.

Alternatively, the report generating sub-module is configured to generate 2n pieces of information in a case that the format of the power report supports dual connectivity, a first pair of information of the 2n pieces of information includes power headroom calculated according to a second power headroom calculating way for a supplementary uplink carrier or other carriers of a primary cell of the user device, a second pair of information includes power headroom calculated according to a second power headroom calculating way for the supplementary uplink carrier or other carriers of a primary and secondary cells of the user device, a third pair of information includes power headroom of the supplementary uplink carrier of the primary cell, and a fourth pair of information includes the power headroom of other carriers of the primary cell. In a case that the primary and secondary cells are not configured with supplementary uplink carrier, n is an integer greater than 5, otherwise, n is an integer greater than 7, and a fifth pair of information of the 2n pieces of information includes power headroom of the supplementary uplink carrier of the primary and secondary cells, and a sixth pair of information includes power headroom of other carriers of the primary and secondary cells.

According to a third aspect of embodiments of the present disclosure, providing an electronic device, can include a processor and a memory for storing executable instructions of the processor.

The processor can be configured to determine whether there is a trigger event of a power headroom report, determine a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device, and calculating the power headroom of the supplementary uplink carrier and/or other carriers according to the way in a case that there is the trigger event, and transmit a power headroom report corresponding to the power headroom to a base station.

A fourth aspect of the present disclosure provides a computer readable storage medium on which a computer program is stored. When the program is executed by a processor, the processor can implement the steps of determining whether there is a trigger event of a power headroom report, determining a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device, and calculating the power headroom of the supplementary uplink carrier and/or other carriers according to the way in a case that there is the trigger event, and transmitting a power headroom report corresponding to the power headroom to a base station.

It should be understood that the above general description and the following detailed description are merely exemplary and explanatory, and should not limit the present disclosure.

BRIEF DESCRIPTION OF THE DRAWINGS

In order to explain the technical solutions in the embodiments of the present application more clearly, the drawings used in the description of the embodiments will be briefly introduced below. Obviously, the drawings in the following description are only some embodiments of the present application. For those of ordinary skill in the art, other drawings can be obtained based on these drawings without paying creative labor.

FIG. 4 is another schematic flowchart of determining whether there is a trigger event for a power headroom report according to an exemplary embodiment.

FIG. 5 is a schematic flowchart of determining a way to calculate power headroom according to an exemplary embodiment.

FIG. 6 is another schematic flowchart of determining a way to calculate power headroom according to an exemplary embodiment.

FIG. 7 is another schematic flowchart of determining a way to calculate power headroom according to an exemplary embodiment.

FIG. 8 is a schematic flowchart of transmitting a power headroom report corresponding to power headroom to a base station according to an exemplary embodiment.

FIG. 9 is a schematic flowchart of generating a power headroom report according to a power headroom and a format according to an exemplary embodiment.

FIG. 10 is a schematic diagram of a format of PHR according to an exemplary embodiment.

FIG. 11 is another schematic flowchart of generating a power headroom report according to power headroom and a format according to an exemplary embodiment.

FIG. 12 is a schematic diagram of another format of PHR according to an exemplary embodiment.

FIG. 13 is a schematic diagram of another format of PHR according to an exemplary embodiment.

FIG. 14 is another schematic flowchart of generating a power headroom report according to power headroom and a format according to an exemplary embodiment.

FIG. 15 is a schematic diagram of another format of PHR according to an exemplary embodiment.

FIG. 16 is a schematic diagram of another format of PHR according to an exemplary embodiment.

DETAILED DESCRIPTION

Exemplary embodiments will be described in detail herein, examples of which are illustrated in the accompanying drawings. When the following description refers to the accompanying drawings, unless other indicated, the same numbers in different accompanying drawings indicate the same or similar elements. The embodiments described in the following exemplary embodiments do not represent all embodiments consistent with the present disclosure. Instead, they are merely examples of apparatuses and methods consistent with aspects of the disclosure as detailed in the appended claims.

Figure 1:
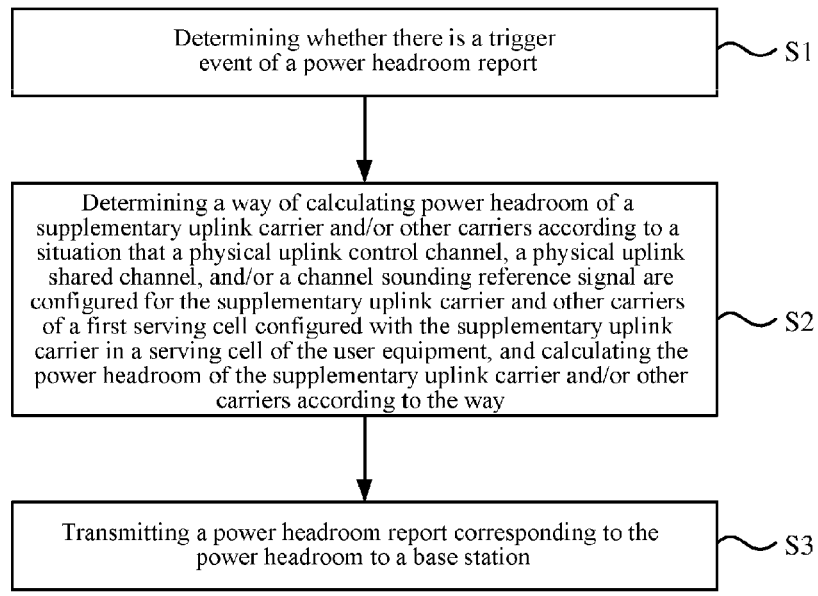
FIG. 1 is a schematic flowchart of a power headroom report transmission method according to an exemplary embodiment.

FIG. 1 is a schematic flowchart of a power headroom report transmission method according to an exemplary embodiment. The power headroom report transmission method shown in this embodiment may be applied to an user device, and the user device may be an electronic device with a communication function, such as a mobile phone, a tablet computer, and a smart wearable device, and the like.

As shown in FIG. 1, the power headroom report transmission method in this embodiment may include the following steps.

In step S1, determining whether there is a trigger event of a power headroom report, and in a case that there is the trigger event, performing step S2.

In step S2, determining a way of calculating a power headroom of a supplementary uplink carrier and/or other carriers according to a situation that a physical uplink control channel (PUCCH), a physical uplink shared channel (PUSCH), and/or a channel sounding reference signal (SRS) are configured for the supplementary uplink carrier and the other carriers (that is, the carrier of a serving cell is different from the supplementary uplink carrier) of a first serving cell configured with the supplementary uplink carrier in a serving cell (Serving Cell) of the user device, and calculating the power headroom of the supplementary uplink carrier and/or other carriers according to the way;

In step S3, transmitting a power headroom report corresponding to the power headroom to a base station.

In one embodiment, in a case that it is determined that there is a trigger event, it may first determine whether the user device can transmit a power headroom report PHR to the base station, where, it can be determined whether the media access control (MAC) entity of the user device is allocated uplink resource at the current transmission timing (that is, the timing of transmitting the PHR to the base station), the uplink resource is used for transmitting new data (that is, new transmission, corresponding to retransmission), and whether the uplink resource allocated through link control protocol (LCP) process can accommodate the PHR required for transmission to the base station.

In a case that the MAC entity is allocated the uplink resource and the uplink resource allocated through the LCP process can accommodate the PHR required for transmission to the base station, the step S2 is performed.

In one embodiment, the calculating way of the power headroom mainly includes a first power headroom calculating way, a second power headroom calculating way and a third power headroom calculating way. Among them, the first power headroom calculating way (Type 1 power headroom) is to calculate the difference between the nominal maximum transmission power of the user device and the PUSCH transmission power, the second power headroom calculating way (Type 2 power headroom) is to calculate the difference between the nominal maximum transmission power of the user device and the transmission power sent by the PUSCH and PUCCH together, the third power headroom calculating way (Type 3 power headroom) is to calculate the difference between the nominal maximum transmission power of the user device and the SRS transmission power.

In embodiments, for a first cell configured with the supplementary uplink carrier SUL, its carriers can be divided into supplementary uplink carriers and other carriers that are not supplementary uplink carriers. The situations that the carriers allocated with different PUCCH, and/or PUSCH, and/or SRS are different, and the calculating ways of the power headroom are also different, therefore, through determining the situation in which the supplementary uplink carrier and other carriers are configured with PUCCH, PUSCH, and/or SRS, the calculating way of the power headroom of the supplementary uplink carrier and/or other carriers may be further determined according to the situation, and calculate the power headroom according to the determined calculating way.

Where, it is only necessary to determine the calculating way of the power headroom of the carrier configured with PUCCH, PUSCH and/or SRS in the supplementary uplink carrier and other carriers, for carrier that is not configured with PUCCH, PUSCH, and/or SRS, since there is no need to transmit PHR to the base station, there is no need to determine the calculating way of the power headroom.

Based on this embodiment, it can be ensured that the power headroom of the supplementary uplink carrier and/or other carriers of the first cell configured with the supplementary uplink carrier is well calculated, and then the PHR corresponding to the power headroom is transmitted to the base station, so that the base station can adjust the power of the user device according to the PHR.

It should be noted that, in addition to the first cell configured with the supplementary uplink carrier in the serving cell of the user device, there may be a second cell not configured with the supplementary uplink carrier, for the second cell, there are only other carriers that are not supplementary uplink carriers, for other carriers of the second cell, if uplink resource is configured, the power headroom is calculated according to the first power headroom calculating way; otherwise, the power headroom is calculated according to the third power headroom calculating way.

Figure 2:
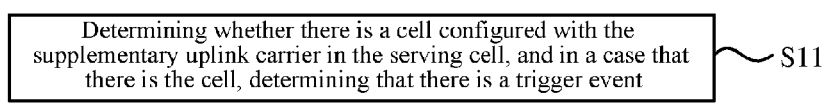
FIG. 2 is a schematic flowchart of determining whether there is a trigger event for a power headroom report according to an exemplary embodiment.

FIG. 2 is a schematic flowchart of determining whether there is a trigger event for a power headroom report according to an exemplary embodiment. As shown in FIG. 2, based on the embodiment shown in FIG. 1, the determining whether there is a trigger event for a power headroom report can include the following.

In step S11, determining whether there is a cell configured with the supplementary uplink carrier in the serving cell, and in a case that there is the cell, determining that there is a trigger event, and performing step S2.

In one embodiment, in a case that a cell in a serving cell of the user device is configured with the supplementary uplink carrier, the serving cell has two carriers: the supplementary uplink carrier and other carriers that are not supplementary uplink carriers. In order to ensure that the base station can accurately adjust the power of the user device, the user device needs to calculate the power headroom for the two carriers separately. Therefore, in a case that a serving cell is configured with supplementary uplink carrier, step S2 may be performed to calculate the power headroom for the supplementary uplink carrier and/or other carriers, and transmit the corresponding PHR to the base station to ensure that the base station can accurately adjust the power of the user device.

Figure 3:
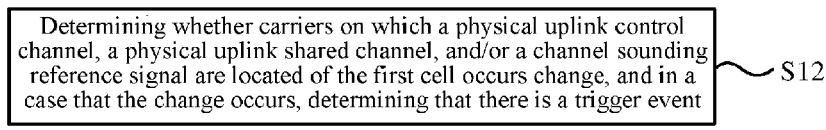
FIG. 3 is another schematic flowchart of determining whether there is a trigger event for a power headroom report according to an exemplary embodiment.

FIG. 3 is another schematic flowchart of determining whether there is a trigger event for a power headroom report according to an exemplary embodiment. As shown in FIG. 3, based on the embodiment shown in FIG. 1, the determining whether there is a trigger event for a power headroom report can include the following.

In step S12, determining whether carriers on which physical uplink control channel, a physical uplink shared channel, and/or a channel sounding reference signal are located of the first cell occur change, and in a case that the change occurs, determining that there is a trigger event.

In one embodiment, in a case that the carriers on which the PUCCH, and/or PUSCH, and/or SRS are located of the first cell which is configured with supplementary uplink carrier occurs change (including change in the carriers on which any one of PUCCH, PUSCH and SRS are located, as well as change in the carriers on which any two of PUCCH, PUSCH, and SRS are located, and change in the carriers on which the three of PUCCH, PUSCH and SRS are located), for example, from a supplementary uplink carrier to the other carrier, from the other carrier to a supplementary uplink carrier, from being configured on a certain carrier to not being configured on any carrier, the power headroom calculating way for the supplementary uplink carrier and/or other carriers may be changed.

For example, before the change, the supplementary uplink carrier is configured with PUSCH and PUCCH, the other carriers are configured with SRS, then calculate the power headroom according to the second power headroom calculating way for the supplementary uplink carrier, and calculate the power headroom according to the third power headroom calculating way for the other carriers. After the change, the PUCCH is configured from the supplementary uplink carrier to the other carriers, for the supplementary uplink carrier, the calculating way of the power headroom is changed from the second power headroom calculating way to the first power headroom calculating way, for the other carriers, the calculating way of the power headroom is changed from the third power headroom calculating way to the first power headroom calculating way.

Because the power headroom calculated according to different power headroom calculating ways is different, according to this embodiment, in a case that the carriers where the PUCCH, PUSCH, and/or SRS are located are changed, the step S2 is performed, so as to re-determine the power headroom calculating way corresponding to each carrier of the first cell, thereby ensuring that the power headroom is accurately calculated, and further ensuring that the base station can accurately adjust the power of the user device according to the corresponding PHR.

FIG. 4 is another schematic flowchart of determining whether there is a trigger event for a power headroom report according to an exemplary embodiment. As shown in FIG. 4, based on the embodiment shown in FIG. 1, the determining whether there is a trigger event for a power headroom report can include the following.

In step S13, determining whether a carrier on which channel sounding reference signal is located is different from a carrier on which link control channel and/or physical uplink shared channel is located after the carriers on which the physical uplink control channel, physical uplink shared channel, and/or the channel sounding reference signal are located of the first cell is changed, and in a case that they are different, determining that there is a trigger event.

In one embodiment, in a case that the carriers on which the PUCCH, PUSCH, and/or SRS are located of the first cell which is configured with the supplementary uplink carrier are changed, the carrier on which the SRS is located, the carrier on which the PUCCH is located and the carrier on which the PUSCH is located are different, that is, the power headroom calculating way of the supplementary uplink carrier and other carriers before the change is changed from the first power headroom calculating way or the second power headroom calculating way to the third power headroom calculating way, therefore, through performing step S2, the calculating way of the power headroom after the change can be determined in time so as to accurately calculate the power headroom, thereby ensuring that the base station can accurately adjust the power of the user device according to the corresponding PHR.

FIG. 5 is a schematic flowchart of determining a way to calculate power headroom according to an exemplary embodiment. As shown in FIG. 5, based on the embodiment shown in FIG. 1, the determining a way of calculating a power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device can include the following.

In step S21, determining a first carrier configured with a physical uplink control channel or a physical uplink shared channel among the supplementary uplink carrier and the other carriers, and then determining a way for calculating power headroom of a first carrier is the first power headroom calculating way.

In one embodiment, in a case that the first carrier among the supplementary uplink carrier and other carriers is configured with the PUCCH or PUSCH, then the difference between the nominal maximum transmission power of the user device and the PUSCH transmission power needs to be calculated, that is, the first power headroom calculating way is used to calculate the power headroom corresponding to the first carrier.

Where, in a case that the first carrier is only configured with PUCCH and not configured with PUSCH, then in the difference between the nominal maximum transmission power of the user device and the PUSCH transmission power is calculated according to the first power headroom calculating way, the PUSCH transmission power may be an estimated value of the user device, for example, the power of the PUSCH in a case that the first carrier is configured with the PUSCH.

FIG. 6 is another schematic flowchart of determining a way to calculate power headroom according to an exemplary embodiment. As shown in FIG. 6, based on the embodiment shown in FIG. 5, the determining a way of calculating a power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device also can also include the following.

In step S211, determining a second carrier configured with a physical uplink control channel and a physical uplink shared channel in the first carrier, and determining a way for calculating power headroom of the second carrier is the first power headroom calculating way and the second power headroom calculating way.

In one embodiment, in a case that the second carrier of the supplementary uplink carrier and other carriers are configured with both PUCCH and PUSCH, then the difference between the nominal maximum transmission power of the user device and the PUSCH transmission power needs to be calculated, that is, the power headroom corresponding to the first carrier is calculated according to the first power headroom calculating way, and the difference between the nominal maximum transmission power of the user device and the transmission power sent by the PUSCH and PUCCH together also needs to be calculated, that is, the power headroom corresponding to the second carrier is calculated according to the second power headroom calculating way.

Where, in step S211, it may be first determined whether PUCCH and PUSCH are allowed to be configured on the same carrier, and in a case that allowed, it is then determined the second carrier that is configured with a physical uplink control channel and a physical uplink shared channel in the first carrier.

FIG. 7 is another schematic flowchart of determining a way to calculate power headroom according to an exemplary embodiment. As shown in FIG. 7, based on the embodiment shown in FIG. 1, the determining a way of calculating a power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device can include the following.

In step S22, determining a third carrier which is not configured with a physical uplink control channel and a physical uplink shared channel, and is configured with a channel sounding reference signal in the supplementary uplink carrier and other carriers, and determining that a way for calculating power headroom of the third carrier is a third power headroom calculating way.

In one embodiment, in a case that the third carrier of the supplementary uplink carrier and other carriers is not configured with PUCCH or PUSCH, but is configured with SRS, then there is no need to calculate the difference between the nominal maximum transmission power of the user device and the PUSCH transmission power, but the difference between the nominal maximum transmission power of the user device and the SRS transmission power, that is, the power headroom corresponding to the third carrier is calculated according to the third power headroom calculating way.

Based on the embodiments shown in FIG. 5 to FIG. 7, it can be ensured that a suitable power headroom calculating way can be accurately determined for the carriers of the first cell, and then the power headroom is accurately calculated according to the determined calculating way.

FIG. 8 is a schematic flowchart of transmitting a power headroom report corresponding to power headroom to a base station according to an exemplary embodiment. As shown in FIG. 8, based on the embodiment shown in FIG. 1, the transmitting a power headroom report corresponding to power headroom to a base station can include the following.

In step S31, determining a format of the power headroom report.

In step S32, generating a power headroom report according to the power headroom and the format.

In step S33, transmitting the power headroom report to the base station.

In one embodiment, after calculating and obtaining the power headroom, a format of the PHR can be determined. Where, the format of the PHR can be set by the base station and notified to the user device, the generated PHR is different for different formats. Therefore, a power headroom report can be generated according to the determined format and power headroom, so that the base station can receive the PHR corresponding to the format set by the base station.

FIG. 9 is a schematic flowchart of generating a power headroom report according to power headroom and a format according to an exemplary embodiment. As shown in FIG. 9, based on the embodiment shown in FIG. 8, the generating a power headroom report according to the power headroom and the format can include the following.

In step S321, generating two pieces of information in a case that the format of the power report supports a first power headroom calculating way and a third power headroom calculating way. One piece of information includes the power headroom of the supplementary uplink carrier, and the other piece of information includes the power headroom of the other carriers.

FIG. 10 is a schematic diagram of a format of PHR according to an exemplary embodiment.

In one embodiment, in a case that the format of the power headroom report supports the first power headroom calculating way and the third power headroom calculating way, the PHR of the corresponding format is shown in FIG. 10, where R is a reserved bit, PH is power headroom, and the reserved bit is used to fill bit which is not set power headroom in the information, the data amount of a piece of information can be one byte, or other data amounts, the following mainly describes an example in a case that the data amount of a piece of information is one byte.

Where one PH can represent the power headroom of the supplementary uplink carrier, the power headroom may occupy six bits in a piece of information, so two reserved bits can be set in the piece of information. Another PH can represent the power headroom of other carrier, the power headroom can occupy five bits, so three reserved bits can be set in this piece of information.

It should be noted that the power headroom may be continuous as described in FIG. 10, or may be set to be discontinuous as required, and the reserved bits may be continuous, for example, as shown in FIG. 10, the power headroom may be set on one side of the power headroom, or may be discontinuous, for example, the power headroom may be set on both sides of the power headroom.

FIG. 11 is another schematic flowchart of generating a power headroom report according to power headroom and a format according to an exemplary embodiment. As shown in FIG. 11, based on the embodiment shown in FIG. 8, the generating a power headroom report according to the power headroom and the format can include the following.

In step S322, generating 2m pieces of information in a case that the format of the power report supports a first power headroom calculating way, a second power headroom calculating way, and a third power headroom calculating way and each of the serving cells. A first pair of information of the 2m pieces of information can include a power headroom calculated according to the second power headroom calculating way of the supplementary uplink carrier or other carriers of the primary cell of the user device. A second pair of information can include the power headroom of the supplementary uplink carrier of the primary cell. A third pair of information can include the power headroom of other carriers of the primary cell.

Where, in a case that the format of the power headroom report also supports a non-special cell configured with a physical uplink control channel and a physical uplink shared channel, in is an integer greater than 4; otherwise, m is an integer greater than 3.

FIG. 12 is a schematic diagram of another format of PHR according to an exemplary embodiment.

In one embodiment, in a case that the format of the power report supports the first power headroom calculating way, the second power headroom calculating way, the third power headroom calculating way and each of the serving cells, the PHR of corresponding format can be as shown in FIG. 12, where R is a reserved bit, PH is a power headroom, and c1 to c7 represent the identity of the serving cell of the user device, P indicates whether the nominal maximum power used to calculate PH will change without power backoff, V indicates whether the PH in the PHR is an actual value calculated based on the actual transmission power of the PUSCH and/or PUCCH, X in TypeX is 1 or 3, Type1 indicates that PH is calculated according to the first power headroom calculating way, Type2 indicates that PH is calculated according to the second power headroom calculating way, and Type3 indicates that PH is calculated according to the third power headroom calculating way, PCell indicates the primary cell of the user device, and SCell indicates the serving cell of the user device. Pcmax, c1 to Pcmax, c (n+3) represent the index of PH, and the index and the corresponding PH are a pair of information.

For example, two PHs (Type1/3, PCell), one of which indicates that the power headroom is calculated according to the first power headroom calculating way or the third power headroom calculating way for the supplementary uplink carrier of the primary cell, the other indicates that power headroom is calculated according to the first power headroom calculating way or the third power headroom calculating way for other uplink carriers of the primary cell. Where the calculating way that Type1/3 and TypeX correspond to can be determined according to any of the embodiments in FIGS. 5 to 7.

According to this embodiment, generating a PHR can ensure that the PHR transmitted to the base station includes both the power headroom calculated for the supplementary uplink carrier and the power headroom calculated for other carriers that are not the supplementary uplink carrier, thereby ensuring that the base station can accurately determine the power headroom of each carrier of the user device.

FIG. 13 is a schematic diagram of another format of PHR according to an exemplary embodiment.

In one embodiment, in a case that the format of the power report further supports a non-special cell SCell configured with PUCCH and PUSCH, the special cell includes a primary cell PCell and a primary and secondary cell PsCell, and a non-special cell SCell, that is, a serving cell other than the PCell and PsCell.

In this case, compared to the embodiment shown in FIG. 12, the PHR may further include PH (Type2, PUCCH SCell), that is, for a non-special cell, in a case that it is configured with PUCCH and PUSCH, then the power headroom of its corresponding carrier is calculated according to second power headroom calculating way.

It should be noted that the PHR in the format shown in FIG. 12 and FIG. 13 is only an example of the present disclosure, where each pair of information may be arranged and transmitted in the order shown in the figure, or may not be arranged and transmitted in the order described in the figure.

FIG. 14 is another schematic flowchart of generating a power headroom report according to power headroom and a format according to an exemplary embodiment. As shown in FIG. 14, based on the embodiment shown in FIG. 8, the generating a power headroom report according to power headroom and a format includes:

In a case that the format of the power report supports dual connectivity, 2n pieces of information are generated, a first pair of information of the 2n pieces of information includes a power headroom calculated according to a second power headroom calculating way for a supplementary uplink carrier or other carriers of the primary cell of the user device, a second pair of information includes the power headroom calculated according to a second power headroom calculating way for the supplementary uplink carrier or other carriers of the primary and secondary cells of the user device, a third pair of information includes the power headroom of the supplementary uplink carrier of the primary cell, and a fourth pair of information includes the power headroom of other carriers of the primary cell;

Where, in a case that the primary and secondary cells are not configured with supplementary uplink carrier, n is an integer greater than 5, otherwise, n is an integer greater than 7, and a fifth pair of information of the n pieces of information includes the power headroom of the supplementary uplink carrier of the primary and secondary cells, and a sixth pair of information includes power headroom of other carriers of the primary and secondary cells.

FIG. 15 is a schematic diagram of another format of PHR according to an exemplary embodiment.

In one embodiment, in a case that the format of the power report supports dual connectivity, the PHR of the corresponding format may be as shown in FIG. 15, where two PHs (Type1/3, PCell), one represents that the power headroom is calculated according to the first power headroom calculating way or the third power headroom calculating way for the supplementary uplink carrier of the primary cell, and the other indicates that the power headroom is calculated according to the first power headroom calculating way or the third power headroom calculating way for the other uplink carriers of the primary cell. Where the calculating way that Type1/3 and TypeX correspond to can be determined according to any of the embodiments in FIG. 5 to FIG. 7.

According to this embodiment, generating a PHR can ensure that the PHR transmitted to the base station includes both the power headroom calculated for the supplementary uplink carrier and the power headroom calculated for other carriers that are not the supplementary uplink carrier, thereby ensuring that the base station accurately determine the power headroom of each carrier of the user device.

FIG. 16 is a schematic diagram of another format of PHR according to an exemplary embodiment.

In one embodiment, in a case that the primary and secondary cells of the user device are configured with supplementary uplink carriers, the corresponding PHR is shown in FIG. 16, compared to the embodiment shown in FIG. 15, the PHR may further include two pairs of PHs (Type1/3, PsCell), that is, the power headroom is calculated according to the first power headroom calculating way or the third power headroom calculating way for the primary and secondary cells.

It should be noted that the PHR in the format shown in FIG. 15 and FIG. 16 is only an example of the present disclosure, where each pair of information may be arranged and transmitted in the order shown in the figure, or may not be arranged and transmitted in the order shown in the figure.

Corresponding to the above described embodiment of the power headroom report transmission method, the present disclosure also provides an embodiment of a power headroom report transmission apparatus.

Figure 17:
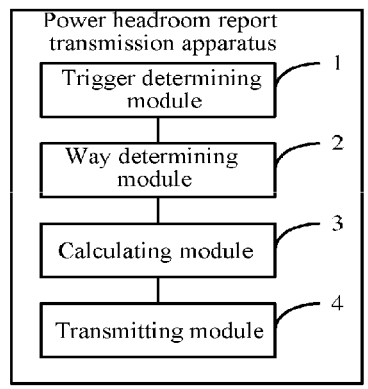
FIG. 17 is a schematic block diagram of a power headroom report transmission apparatus according to an exemplary embodiment.

FIG. 17 is a schematic block diagram of a power headroom report transmission apparatus according to an exemplary embodiment. The power headroom report transmission apparatus in this embodiment is for applying to user device and may include a trigger determining module 1 configured to determine whether there is a trigger event of a power headroom report, and a way determining module 2 that is configured to, in a case that there is a trigger event, determine a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device. The apparatus can further include a calculating module 3 that is configured to calculate power headroom of the supplementary uplink carrier and/or other carriers according to the way, and a transmitting module 4 that is configured to transmit a power headroom report corresponding to the power headroom to a base station.

Figure 18:
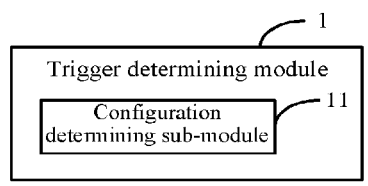
FIG. 18 is a schematic block diagram of a trigger determining module according to an exemplary embodiment.

FIG. 18 is a schematic block diagram of a trigger determining module according to an exemplary embodiment. As shown in FIG. 18, based on the embodiment shown in FIG. 17, the trigger determining module 1 can include a configuration determining sub-module 11 that is configured to determine whether there is a cell configured with the supplementary uplink carrier in the serving cell, and in a case that there is the cell, determine that there is a trigger event.

Figure 19:
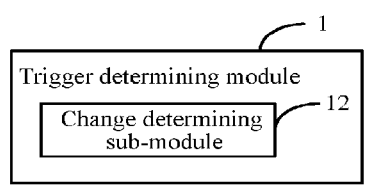
FIG. 19 is a schematic block diagram of another trigger determining module according to an exemplary embodiment.

FIG. 19 is a schematic block diagram of another trigger determining module according to an exemplary embodiment. As shown in FIG. 19, based on the embodiment shown in FIG. 17, the trigger determining module 1 can include a change determining sub-module 12 that is configured to determine whether carriers on which physical uplink control channel, a physical uplink shared channel, and/or a channel sounding reference signal are located of the first cell occur change, and in a case that the change occurs, determine that there is a trigger event.

Figure 20:
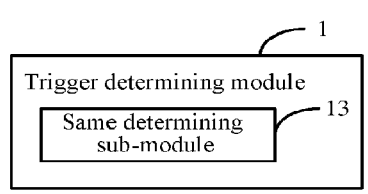
FIG. 20 is a schematic block diagram of another trigger determining module according to an exemplary embodiment.

FIG. 20 is a schematic block diagram of another trigger determining module according to an exemplary embodiment. As shown in FIG. 20, based on the embodiment shown in FIG. 17, the determining whether there is a trigger event of a power headroom report can include a same determining sub-module 13 configured to determine whether a carrier on which channel sounding reference signal is located is different from a carrier on which link control channel and/or physical uplink shared channel is located after the carriers on which the physical uplink control channel, the physical uplink shared channel, and/or the channel sounding reference signal are located of the first cell are changed, and in a case that they are different, determine that there is a trigger event.

Alternatively, the way determining module is configured to determine a first carrier configured with a physical uplink control channel or a physical uplink shared channel among the supplementary uplink carrier and other carriers, and then determine a way for calculating power headroom of the first carrier is the first power headroom calculating way.

In another embodiment, the way determining module can be configured to determine a second carrier configured with a physical uplink control channel and a physical uplink shared channel in the first carrier, and determine a way for calculating power headroom of the second carrier is the first power headroom calculating way and the second power headroom calculating way.

Alternatively, the way determining module is configured to determine a third carrier which is not configured with a physical uplink control channel and a physical uplink shared channel, and is configured with a channel sounding reference signal in the supplementary uplink carrier and other carriers, and determine that a way for calculating power headroom of the third carrier is a third power headroom calculating way.

Figure 21:
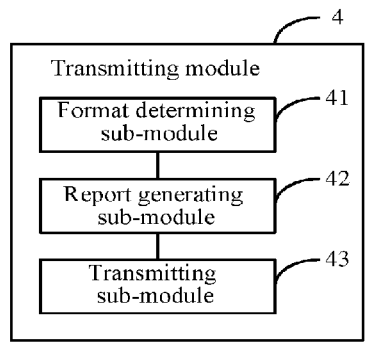
FIG. 21 is a schematic block diagram of a transmitting module according to an exemplary embodiment.

FIG. 21 is a schematic block diagram of a transmitting module according to an exemplary embodiment. As shown in FIG. 21, based on the embodiment shown in FIG. 17, the transmitting module 4 can include a format determining sub-module 41 that is configured to determine a format of the power headroom report, a report generating sub-module 42 that is configured to generate a power headroom report according to the power headroom and the format, and a transmitting sub-module 43 that is configured to transmit the power headroom report to a base station.

Alternatively, the report generating sub-module can be configured to generate two pieces of information in a case that the format of the power report supports a first power headroom calculating way and a third power headroom calculating way, where one piece of information includes the power headroom of the supplementary uplink carrier, and the other piece of information includes the power headroom of the other carriers.

Alternatively, the report generating sub-module is configured to generate 2m pieces of information in a case that the format of the power report supports a first power headroom calculating way, a second power headroom calculating way, a third power headroom calculating way and each of the serving cells, a first pair of information of the 2m pieces of information includes power headroom calculated according to the second power headroom calculating way for the supplementary uplink carrier or other carriers of the primary cell of the user device, a second pair of information includes the power headroom of the supplementary uplink carrier of the primary cell, and a third pair of information includes the power headroom of other carriers of the primary cell.

Where, in a case that the format of the power headroom report also supports a non-special cell configured with a physical uplink control channel and a physical uplink shared channel, m is an integer greater than 4; otherwise, m is an integer greater than 3.

Alternatively, the report generating sub-module can be configured to generate 2n pieces of information in a case that the format of the power report supports dual connectivity, a first pair of information of the 2n pieces of information includes a power headroom calculated according to a second power headroom calculating way for a supplementary uplink carrier or other carriers of the primary cell of the user device, a second pair of information includes the power headroom calculated according to a second power headroom calculating way for the supplementary uplink carrier or other carriers of the primary and secondary cells of the user device, a third pair of information includes the power headroom of the supplementary uplink carrier of the primary cell, and a fourth pair of information includes the power headroom of other carriers of the primary cell.

Where, in a case that the primary and secondary cells are not configured with supplementary uplink carrier, n is an integer greater than 5, otherwise, n is an integer greater than 7, and a fifth pair of information in the 2n pieces of information includes the power headroom of the supplementary uplink carrier of the primary and secondary cells, and a sixth pair of information includes power headroom of other carriers of the primary and secondary cells.

Regarding the apparatus in the above described embodiment, the specific manner in which each module performs operations has been described in detail in the embodiment of the related method, and will not be described in detail here.

As for the apparatus embodiment, since it basically corresponds to the method embodiment, the relevant parts may refer to the description of the method embodiment. The apparatus embodiments described above are only schematic, and the modules described as separate components may or may not be physically separated. The components displayed as modules may or may not be physical modules, may be located in one place, or may be distributed on multiple network modules. Some or all of the modules can be selected according to actual needs to achieve the objectives of the solution of the present disclosure. Those of ordinary skill in the art can understand and implement without creative efforts.

An embodiment of the present disclosure also relates to an electronic device. The device can include a processor, and a memory for storing executable instructions of the processor.

The processor can be configured to determine whether there is a trigger event of a power headroom report, determine a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device, and calculate the power headroom of the supplementary uplink carrier and/or other carriers according to the way in a case that there is the trigger event, and transmit a power headroom report corresponding to the power headroom to a base station.

An embodiment of the present disclosure also relates to a computer readable storage medium on which a computer program is stored. When the program is executed by a processor, the processor can implement the method of determining whether there is a trigger event of a power headroom report, determining a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device, and calculating the power headroom of the supplementary uplink carrier and/or other carriers according to the way in a case that there is the trigger event; and transmitting a power headroom report corresponding to the power headroom to a base station.

Figure 22:
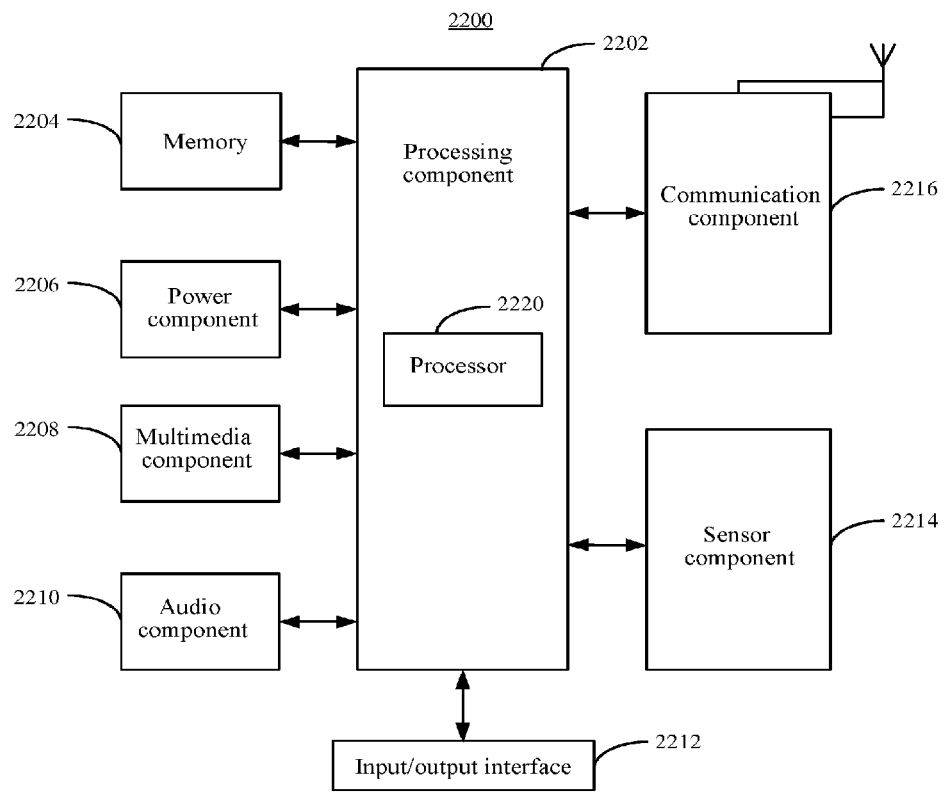
FIG. 22 is a schematic block diagram of an apparatus for transmitting a power headroom report according to an exemplary embodiment.

FIG. 22 is a schematic block diagram of an apparatus 2200 for transmitting a power headroom report according to an exemplary embodiment. The apparatus 2200 may be a mobile phone, a computer, a digital broadcasting terminal, a messaging device, a game console, a tablet device, a medical device, a fitness device, a personal digital assistant, and the like.

Referring to FIG. 22, the apparatus 2200 may include one or more of the following components: a processing component 2202, a memory 2204, a power component 2206, a multimedia component 2208, an audio component 2210, an input/output (I/O) interface 2212, a sensor component 2214 and a communication component 2216.

The processing component 2202 typically controls overall operations of the apparatus 2200, such as the operations associated with display, telephone calls, data communications, camera operations and recording operations. The processing component 2202 may include one or more processors 2220 to execute instructions to perform all or part of the steps in the above described methods. Moreover, the processing component 2202 may include one or more modules which facilitate the interaction between the processing component 2202 and other components. For instance, the processing component 2202 may include a multimedia module to facilitate the interaction between the multimedia component 2208 and the processing component 2202.

The memory 2204 is configured to store various types of data to support the operation of the apparatus 2200. Examples of such data include instructions for any applications or methods operated on the apparatus 2200, contact data, phonebook data, messages, pictures, video and etc. The memory 2204 may be implemented by using any type of volatile or non-volatile memory devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory and a magnetic or optical disk.

The power component 2206 provides power to various components of the apparatus 2200. The power component 2206 may include a power management system, one or more power sources and any other components associated with the generation, management and distribution of power for the apparatus 2200.

The multimedia component 2208 includes a screen providing an output interface between the apparatus 2200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips and gestures on the touch panel. The touch sensors may not only sense a boundary of a touch or slip action, but also sense a period of time and a pressure associated with the touch or slip action. In some embodiments, the multimedia component 2208 includes a front camera and/or a rear camera. The front camera and the rear camera may receive an external multimedia data in a case that the apparatus 2200 is in an operation mode, such as a photographing mode or a video mode. Each of the front camera and the rear camera may be a fixed optical lens system or have focus and optical room capability.

The audio component 2210 is configured to output and/or input audio signals. For example, the audio component 2210 includes a microphone (MIC) configured to receive an external audio signal in a case that the apparatus 2200 is in an operation mode, such as a call mode, a recording mode or a voice recognition mode. The received audio signal may be further stored in the memory 2204 or transmitted via the communication component 2216. In some embodiments, the audio component 2210 further includes a speaker to output audio signals.

The I/O interface 2212 provides an interface between the processing component 2202 and peripheral interface modules, the peripheral interface modules may be a keyboard, a click wheel, buttons and the like. These buttons may include, but are not limited to, a home button, a volume button, a starting button or a locking button.

The sensor component 2214 includes one or more sensors to provide status assessments of various aspects for the apparatus 2200. For instance, the sensor component 2214 may detect an open/closed status of the apparatus 2200, relative positioning of components, e.g., the components may be the display and the keypad of the apparatus 2200; the sensor component 2214 may also detect a change in position of the apparatus 2200 or a component of the apparatus 2200, a presence or absence of user contact with the apparatus 2200, an orientation or an acceleration/deceleration of the apparatus 2200 and a change in temperature of the apparatus 2200. The sensor component 2214 may include a proximity sensor configured to detect the presence of nearby objects without any physical contact. The sensor component 2214 may further include a light sensor, such as a CMOS or CCD image sensor configured to use in imaging applications. In some embodiments, the sensor component 2214 may further include an accelerometer sensor, a gyroscope sensor, a magnetic sensor, a pressure sensor or a temperature sensor.

The communication component 2216 is configured to facilitate communication, wired or wirelessly, between the apparatus 2200 and other devices. The apparatus 2200 can access a wireless network based on a communication standard, such as WiFi, 2G, or 3G, or 4G, or 5G or a combination thereof. In one exemplary embodiment, the communication component 2216 receives a broadcast signal or broadcast-associated information from an external broadcast management system via a broadcast channel. In one exemplary embodiment, the communication component 2216 further includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In exemplary embodiments, the apparatus 2200 may be realized with one or more application specific integrated circuits (ASIC), digital signal processors (DSP), digital signal processing devices (DSPD), programmable logic devices (PLD), field programmable gate arrays (FPGA), controllers, micro-controllers, microprocessors or other electronic components, for performing above mentioned method.

In exemplary embodiments, there is also provided a non-transitory computer readable storage medium including instructions, for example, a memory 2204 including instructions, the above instructions may be executed by processor 2220 of apparatus 2200 to perform the above described method. For example, the non-transitory computer readable storage medium may be a ROM, a random access memory (RAM), a CD-ROM, a magnetic tape, a floppy disk and an optical data storage device, and the like.

After considering this description and carrying out the embodiments disclosed herein, those skilled in the art may easily think of other embodiments of the present disclosure. The present application is meant to cover any variations, usage or adaptive change of the present disclosure, and these variations, usage or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A power headroom report transmission method, that is applied to a user device, the method comprising:
    determining whether there is a trigger event of a power headroom report;
    determining a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first serving cell configured with the supplementary uplink carrier in a serving cell of the user device, and calculating the power headroom of the supplementary uplink carrier and/or other carriers according to the way when the trigger event is determined; and
    transmitting the power headroom report corresponding to the power headroom to a base station,
    wherein the determining whether there is the trigger event for the power headroom report further comprises:
    determining that there is the trigger event when carriers on which the physical uplink control channel, physical uplink shared channel, and/or channel sounding reference signal are located in the first cell change.

2. The power headroom report transmission method according to claim 1, wherein the determining whether there is the trigger event for the power headroom report further comprises:
    determining that there is the trigger event when a carrier on which the channel sounding reference signal is located is different from a carrier on which the physical uplink control channel and/or the physical uplink shared channel is located after carriers on which the physical uplink control channel, the physical uplink shared channel, and/or the channel sounding reference signal are located in the first cell are changed.

3. The power headroom report transmission method according to claim 1, wherein the determining the way of calculating power headroom of the supplementary uplink carrier and/or other carriers according to the situation that the physical uplink control channel, physical uplink shared channel, and/or channel sounding reference signal are configured for the supplementary uplink carrier and other carriers of the first serving cell configured with the supplementary uplink carrier in the serving cell of the user device further comprises:
    determining a first carrier configured with the physical uplink control channel or the physical uplink shared channel among the supplementary uplink carrier and other carriers, and then determining the way for calculating power headroom of the first carrier is a first power headroom calculating way.

4. The power headroom report transmission method according to claim 3, wherein the determining the way of calculating power headroom of the supplementary uplink carrier and/or other carriers according to the situation that the physical uplink control channel, physical uplink shared channel, and/or channel sounding reference signal are configured for the supplementary uplink carrier and other carriers of the first serving cell configured with the supplementary uplink carrier in the serving cell of the user device further comprises:
    determining a second carrier configured with the physical uplink control channel and the physical uplink shared channel in the first carrier, and determining the way for calculating power headroom of the second carrier is the first power headroom calculating way and a second power headroom calculating way.

5. The power headroom report transmission method according to claim 1, wherein the determining the way of calculating power headroom of the supplementary uplink carrier and/or other carriers according to the situation that the physical uplink control channel, physical uplink shared channel, and/or channel sounding reference signal are configured for the supplementary uplink carrier and other carriers of the first serving cell configured with the supplementary uplink carrier in the serving cell of the user device further comprises:

determining a third carrier which is not configured with the physical uplink control channel and the physical uplink shared channel, and is configured with the channel sounding reference signal in the supplementary uplink carrier and other carriers, and determining that the way for calculating power headroom of the third carrier is a third power headroom calculating way.

6. The power headroom report transmission method according to claim 1, wherein the transmitting the power headroom report corresponding to the power headroom to a base station further comprises:

determining a format of the power headroom report;
generating the power headroom report according to the power headroom and the format; and
transmitting the power headroom report to the base station.

7. The power headroom report transmission method according to claim 6, wherein the generating the power headroom report according to the power headroom and the format further comprises:

generating two pieces of information in a case that the format of the power headroom report supports a first power headroom calculating way and a third power headroom calculating way, one piece of information includes power headroom of the supplementary uplink carrier, and the other piece of information includes power headroom of the other carriers.

8. The power headroom report transmission method according to claim 6, wherein the generating the power headroom report according to the power headroom and the format further comprises:

generating 2m pieces of information in a case that the format of the power headroom report supports a first power headroom calculating way, a second power headroom calculating way, a third power headroom calculating way and each of the serving cells, a first pair of information of the 2m pieces of information includes power headroom calculated according to the second power headroom calculating way of the supplementary uplink carrier or other carriers of a primary cell of the user device, a second pair of information includes power headroom of the supplementary uplink carrier of the primary cell, and a third pair of information includes power headroom of the other carriers of the primary cell, wherein in a case that the format of the power headroom report also supports a non-special cell configured with the physical uplink control channel and the physical uplink shared channel, m is an integer greater than 4, otherwise, m is an integer greater than 3.

9. The power headroom report transmission method according to claim 6, wherein the generating the power headroom report according to the power headroom and the format further comprises:

generating 2n pieces of information in a case that the format of the power headroom report supports dual connectivity, a first pair of information of the 2n pieces of information includes power headroom calculated according to a second power headroom calculating way for the supplementary uplink carrier or the other carriers of a primary cell of the user device, a second pair of information includes power headroom calculated according to the second power headroom calculating way for the supplementary uplink carrier or the other carriers of a primary and secondary cells of the user device, a third pair of information includes power headroom of the supplementary uplink carrier of the primary cell, and a fourth pair of information includes the power headroom of the other carriers of the primary cell, wherein in a case that the primary and secondary cells are not configured with the supplementary uplink carrier, n is an integer greater than 5, otherwise, n is an integer greater than 7, and a fifth pair of information of the 2n pieces of information includes power headroom of the supplementary uplink carrier of the primary and secondary cells, and a sixth pair of information includes power headroom of the other carriers of the primary and secondary cells.

10. A power headroom report transmission apparatus that is applied to a user device, comprising:

a trigger determining module that is configured to determine whether there is a trigger event of a power headroom report;

a way determining module that is configured to determine a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first cell configured with the supplementary uplink carrier in a serving cell of the user device in a case that there is the trigger event;

a calculating module that is configured to calculate the power headroom of the supplementary uplink carrier and/or other carriers according to the way; and a transmitting module that is configured to transmit the power headroom report corresponding to the power headroom to a base station, wherein the trigger determining module further comprises:

a change determining sub-module that is configured to determine that there is the trigger event when carriers on which the physical uplink control channel, the physical uplink shared channel, and/or the channel sounding reference signal are located in the first cell change.

11. The power headroom report transmission apparatus according to claim 10, wherein the trigger determining module further comprises:

a same determining sub-module that is configured to determine that there is the trigger event when a carrier on which the channel sounding reference signal is located is different from a carrier on which the physical uplink control channel and/or the physical uplink shared channel is located after the carriers on which the physical uplink control channel, the physical uplink shared channel, and/or the channel sounding reference signal are located in the first cell is changed.

12. The power headroom report transmission apparatus according to claim 10, wherein the way determining module is configured to determine a first carrier configured with the physical uplink control channel or the physical uplink shared channel among the supplementary uplink carrier and the other carriers, and then determine the way for calculating power headroom of the first carrier is a first power headroom calculating way.

13. The power headroom report transmission apparatus according to claim 12, wherein, the way determining module is configured to determine a second carrier configured with the physical uplink control channel and the physical uplink shared channel in the first carrier, and determine the way for calculating power headroom of the second carrier is the first power headroom calculating way and a second power headroom calculating way.

14. The power headroom report transmission apparatus according to claim 10, wherein the way determining module is configured to determine a third carrier which is not configured with the physical uplink control channel and the physical uplink shared channel, and is configured with the channel sounding reference signal in the supplementary uplink carrier and the other carriers, and determine that the way for calculating power headroom of the third carrier is a third power headroom calculating way.

15. The power headroom report transmission apparatus according to claim 10, wherein the transmitting module further comprises:
   a format determining sub-module that is configured to determine a format of the power headroom report;
   a report generating sub-module that is configured to generate the power headroom report according to the power headroom and the format;
   a transmitting sub-module that is configured to transmit the power headroom report to the base station.

16. An electronic device, comprising:
a processor;
a memory for storing executable instructions of the processor;
wherein the processor is configured to:
determine whether there is a trigger event of a power headroom report;
determine a way of calculating power headroom of a supplementary uplink carrier and/or other carriers according to a situation that a physical uplink control channel, a physical uplink shared channel, and/or a channel sounding reference signal are configured for the supplementary uplink carrier and other carriers of a first cell configured with the supplementary uplink carrier in a serving cell of the user device, and calculating power headroom of the supplementary uplink carrier and/or other carriers according to the way in a case that there is the trigger event; and
transmit the power headroom report corresponding to the power headroom to a base station,
wherein the determining whether there is the trigger event for the power headroom report further comprises:
determining that there is the trigger event when carriers on which the physical uplink control channel, physical uplink shared channel and/or channel sounding reference signal are located in the first cell change.

* * * * *